Nov. 23, 1971   S. A. C. BROWNING   3,621,632
METHOD AND MEANS FOR APPLYING BAG CLOSURES OR FASTENERS
Filed Jan. 12, 1970   8 Sheets-Sheet 1
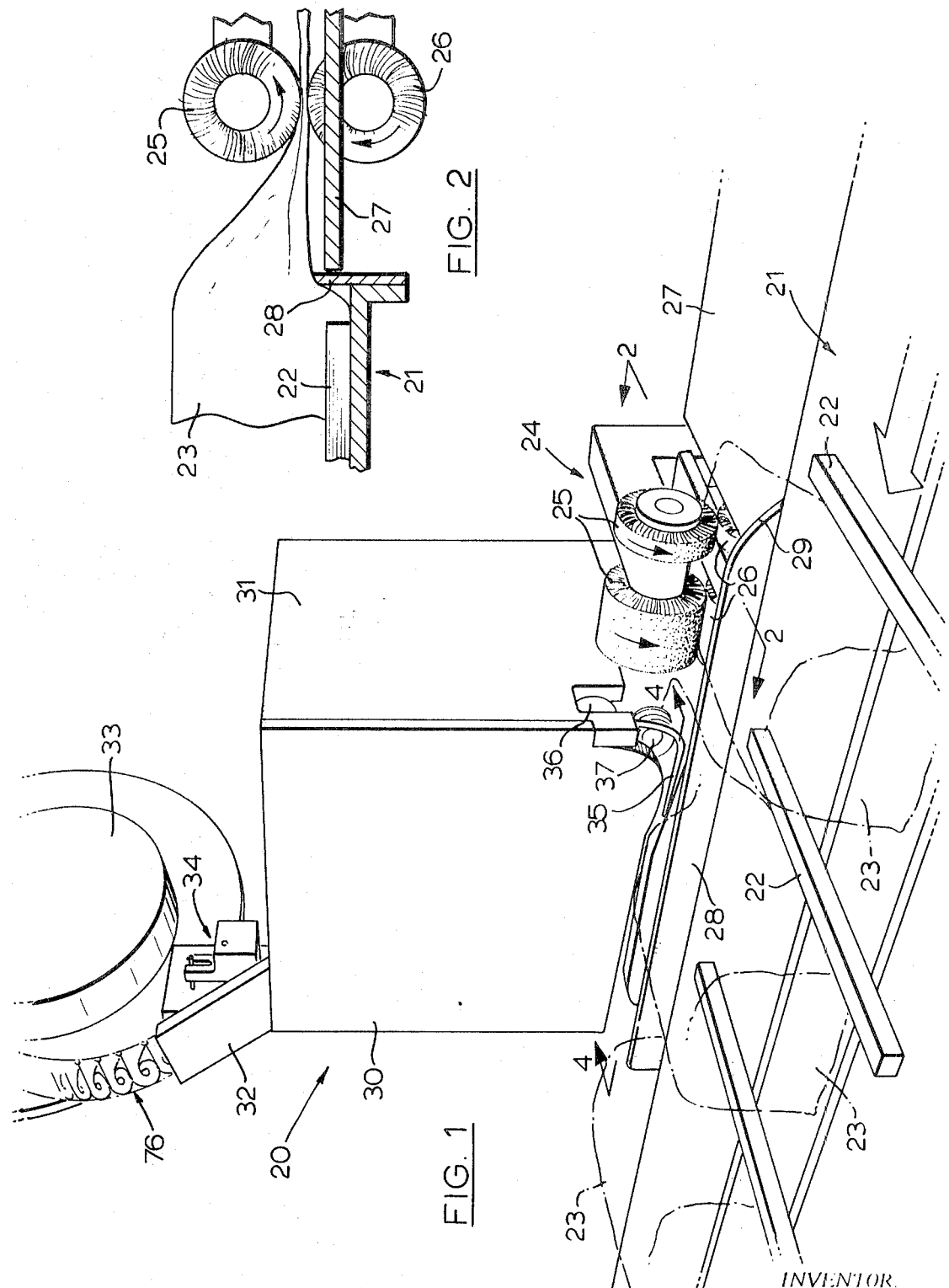
INVENTOR.
STANLEY A.C. BROWNING
BY
Neill M.S. Johnston
Agent Nov. 23, 1971    S. A. C. BROWNING    3,621,632
METHOD AND MEANS FOR APPLYING BAG CLOSURES OR FASTENERS
Filed Jan. 12, 1970    8 Sheets-Sheet 3

*INVENTOR.*
STANLEY A.C. BROWNING

BY *Neill M. S. Johnston*

Agent

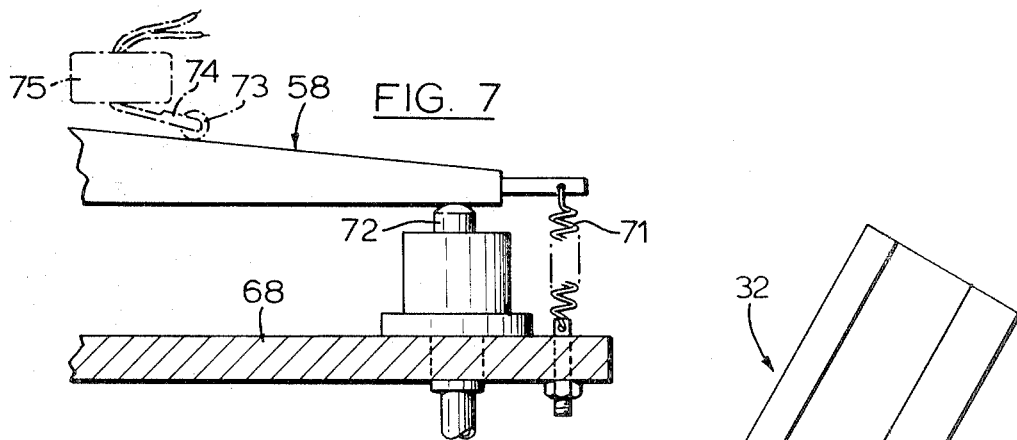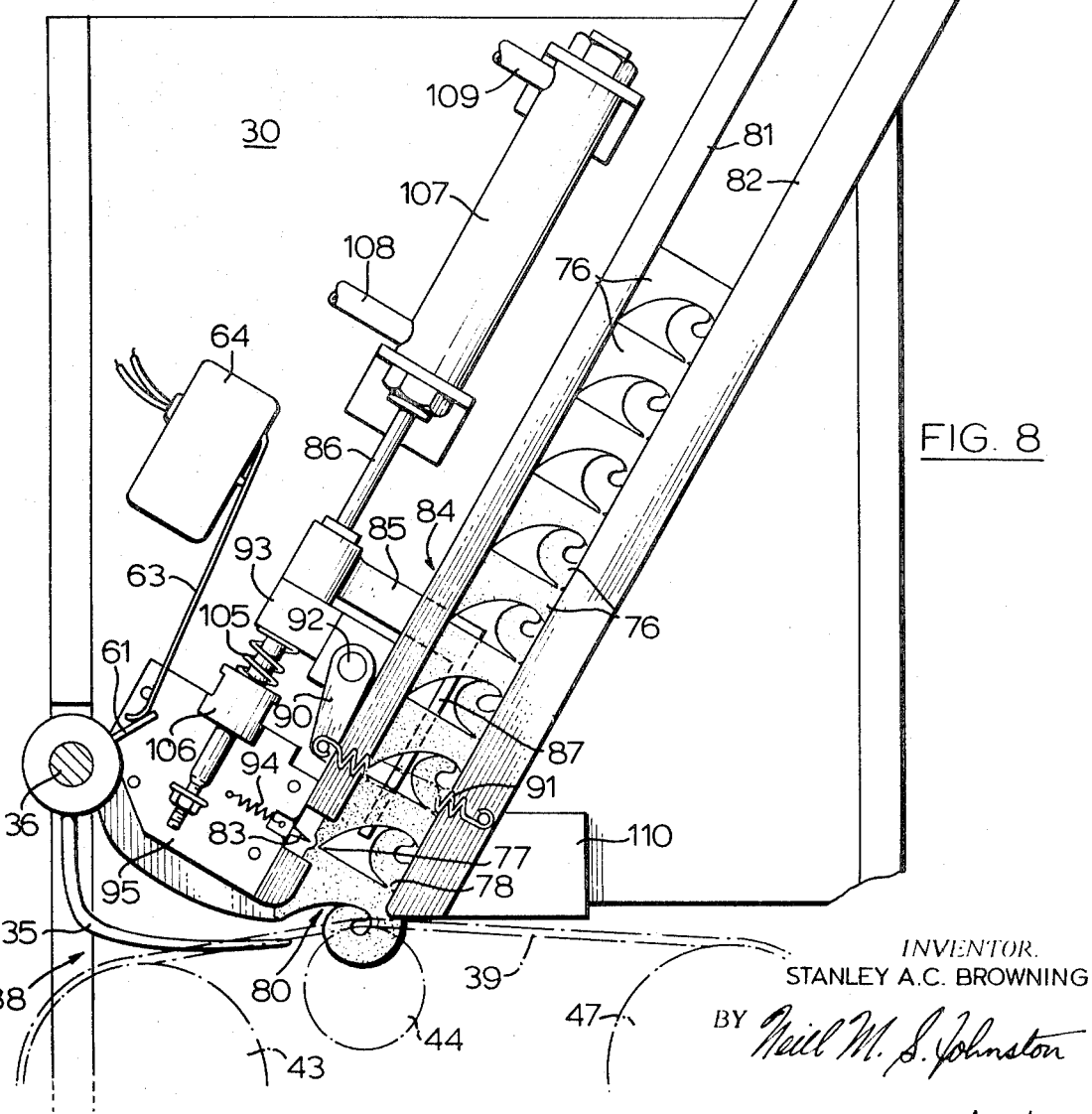

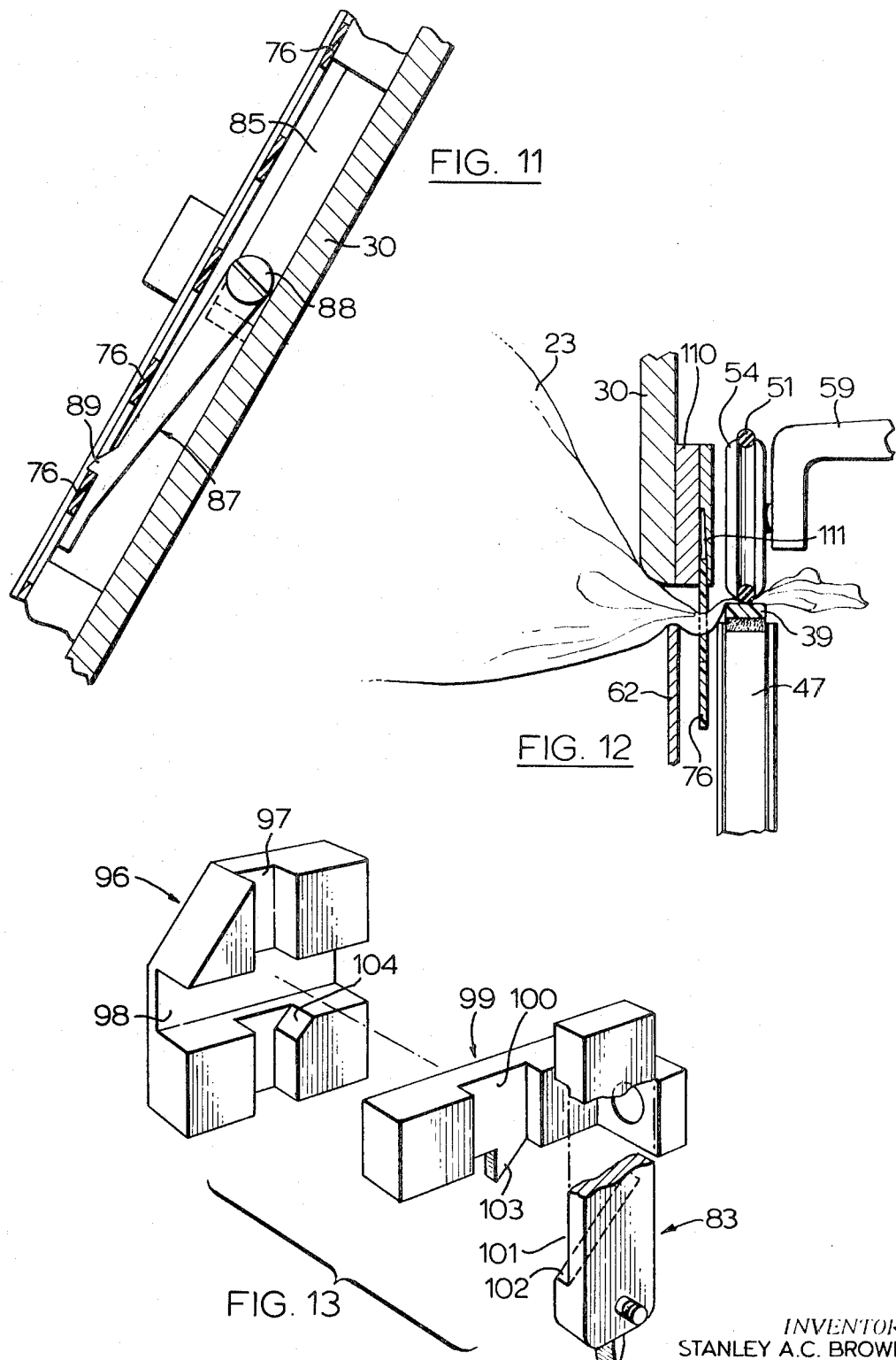

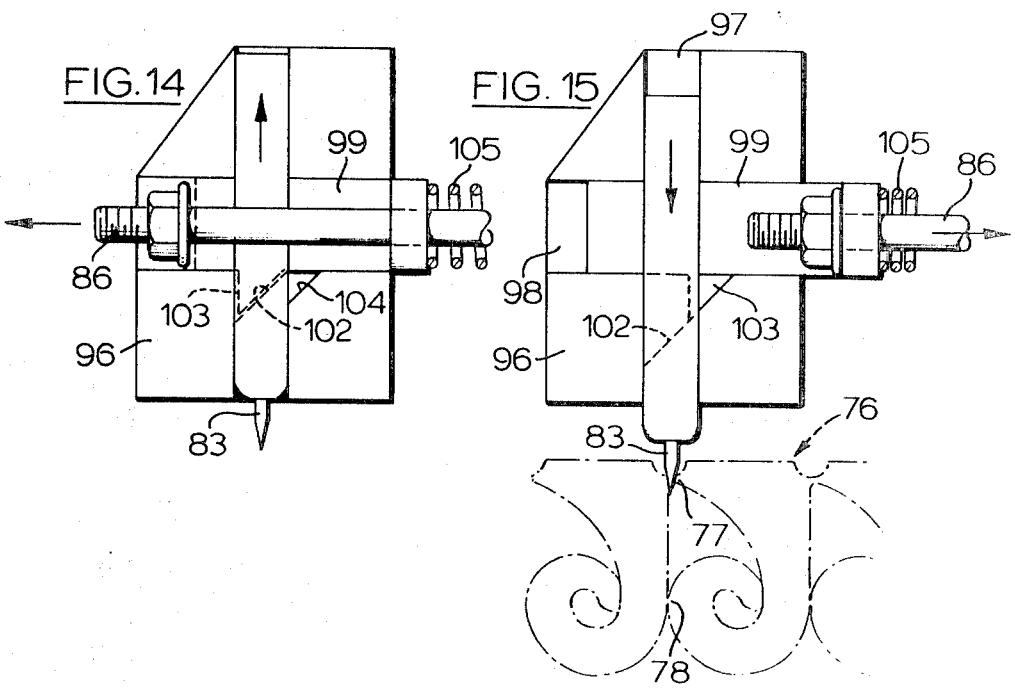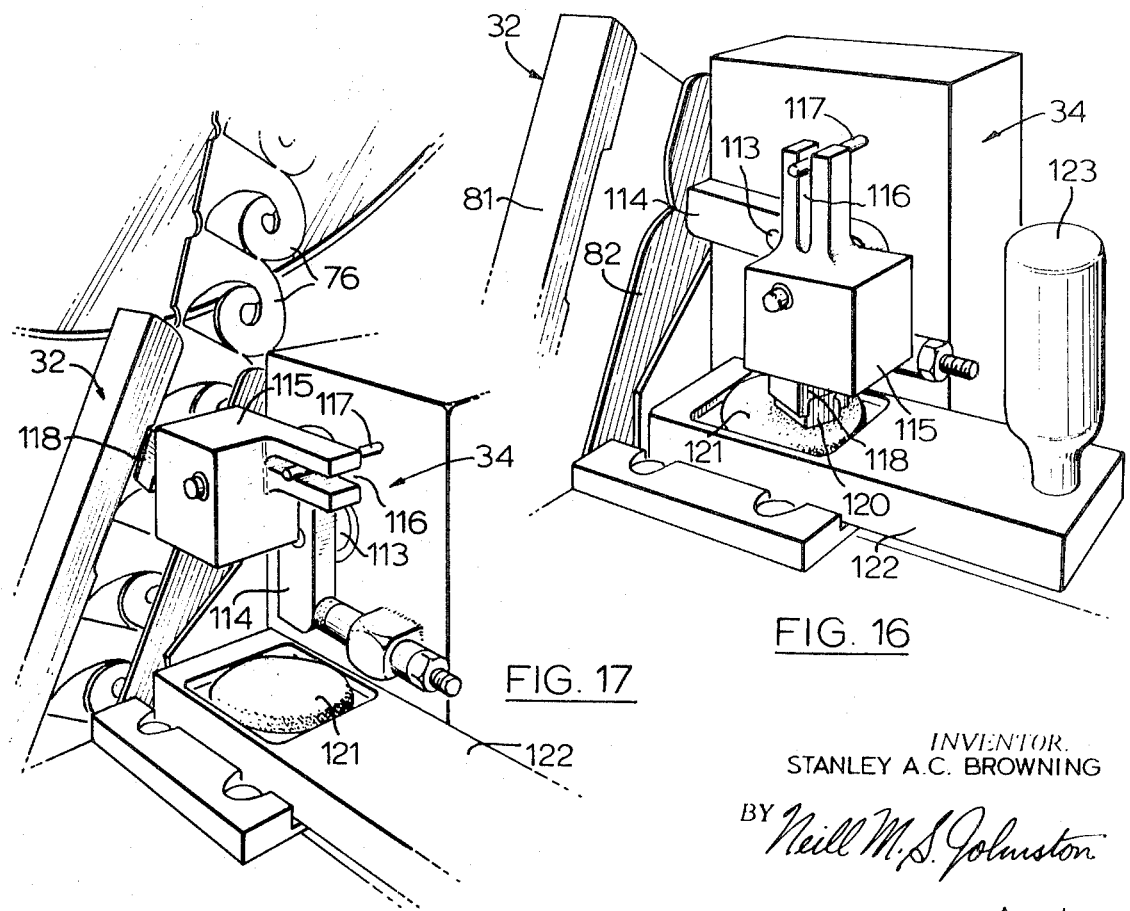

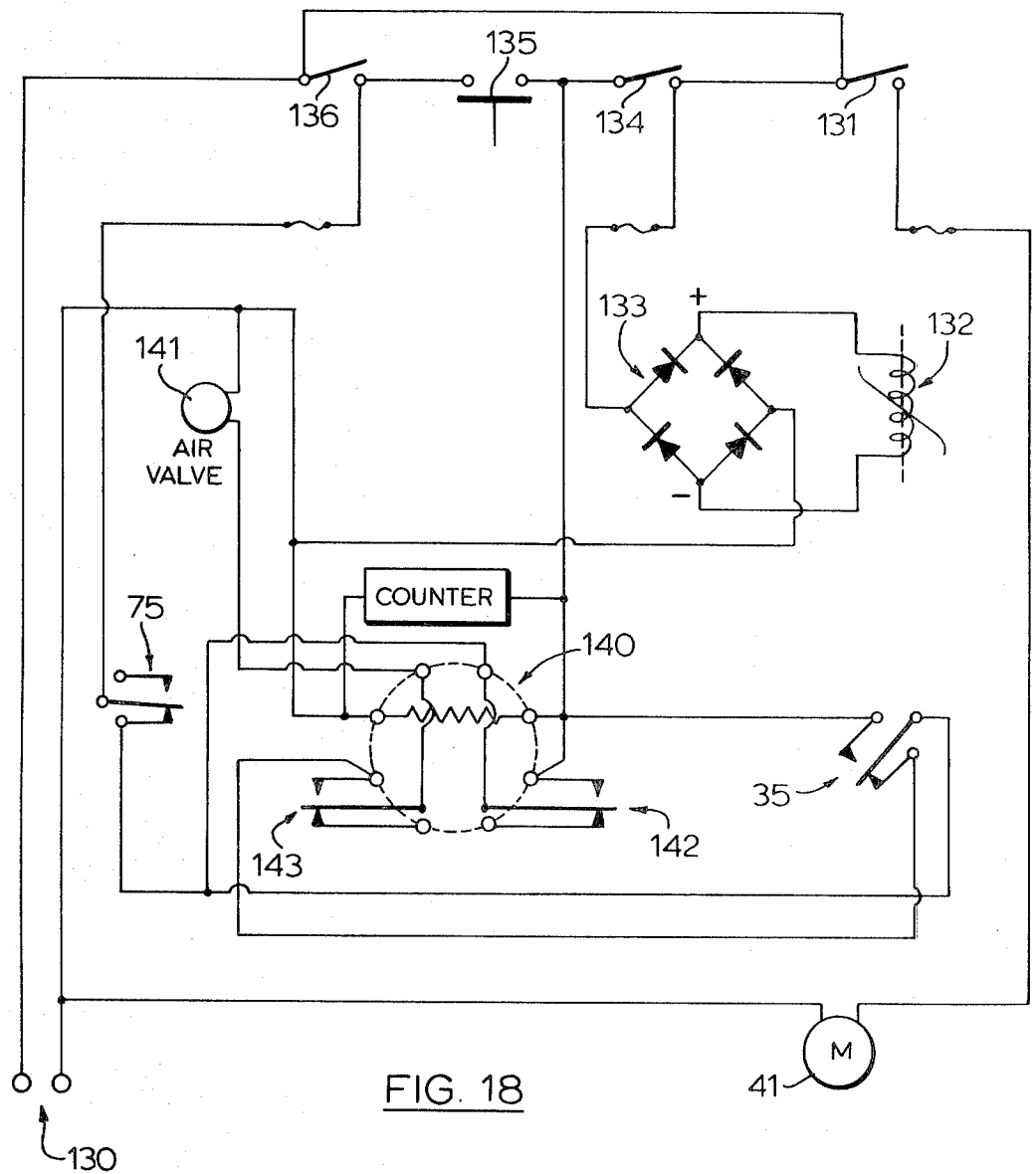

United States Patent Office 3,621,632
Patented Nov. 23, 1971

3,621,632
METHOD AND MEANS FOR APPLYING BAG CLOSURES OR FASTENERS
Stanley A. C. Browning, Glen Williams, Ontario, Canada, assignor to Hybrid Turkeys Limited, Toronto, Ontario, Canada
Filed Jan. 12, 1970, Ser. No. 2,325
Int. Cl. B65b 7/02
U.S. Cl. 53—138 A                                        12 Claims

ABSTRACT OF THE DISCLOSURE

A novel method of a machine for applying closures of the form disclosed in Canadian Pat. 738,149, issued July 12, 1966, entitled "Bag Closure Fastener."

The machine employs the provision of a ground edge on the fastener and the characteristic facility of that fastener to flex while being applied to achieve a substantially continuous travel of the bag to which the closure is applied.

On the entry of a bag neck into the machine feed conveyor a cutting mechanism responds to partially sever a fastener which is in a bag receiving position. The feed gathers the bag neck into the bag receiving position where it is engaged by a second portion of the conveying mechanism and carried through a predetermined path. The fastener or closure is carried along in engagement with the bag neck through the rear edge of the closure being wedged down and the junction between the closure being applied and a succeeding closure is broken by the combined movement of the closure and the bag.

BACKGROUND OF THE INVENTION

The fastener disclosed in Canadian Pat. 738,419 and the novel form of that fastener has led to the development of the present machine. It is evident that the commercial application of that fastener required a machine which could apply the fastener economically and at speeds competitive with other types of closures or fasteners applying machines.

Other forms of machines which were available were not adaptable to the application of the above-mentioned fasteners. The other machines had been developed for the application of particular fasteners. But almost without exception they required the bag to be inserted directly into the closure opening by compression or by folding the bag neck through the closure opening, or by threading it through the closure opening.

These modes of operation were sufficient. They accomplished their function but both were characterised by a hesitation or delay. The delay may take the form of a prolonged feeding step to ensure the threading is accomplished properly or it may result from separate feeding and cutting of the fastener from its feed.

SUMMARY OF THE INVENTION

The present invention relates to a method and apparatus for applying closures or fasteners to bags. It has particular application to flexible bags of such material as polyethylene and is useful for applying closures of the form disclosed in Canadian Pat. 738,149, issued July 12, 1966.

In view of the problems with the prior methods and machines for applying fasteners it is the principal object of the present invention to provide an improved method and means for applying fasteners or closures to bags.

It is another object of the present invention to provide an improved method and means for applying bag closures which is both fast and economical.

In accordance with these objects there is provided in this present invention a method of applying a closure to a bag which comprises the steps of transporting a bag through a neck flattening station, gathering a portion of the bag neck and aligning it with a closure opening, and rotating the closure and bag relative to one another to apply the closure to the gathered portion of the bag neck.

Also in accordance with the present invention there is provided a machine for applying closures to bag necks which comprises, closure feed means for moving a closure into a bag applying position; conveying means for transporting a bag neck along a predetermined path; said conveying means including a gathering station for collecting said bag neck into a closure applying position; and a closure applying station including means for moving said bag neck through said closure applying position along said predetermined path whereby said closure is applied by relative rotation of said bag neck and said closure.

These and other features and objects will be more apparent from the description of the specific embodiment shown in the drawings which serves to illustrate the invention by way of example.

DESCRIPTION OF THE DRAWINGS

FIG. 1 is a general perspective view of a bag closure applying machine in accordance with a preferred embodiment of the invention;

FIG. 2 is a partial schematic side view taken along line 2—2 of FIG. 1 and serves to illustrate a preliminary neck flattening operation;

FIG. 7 is a fragmentary view, partially in section, taken along line 7—7 of FIG. 5;

FIG. 8 is a schematic view from the rear of the interior of the front wall of the embodiment of the invention illustrated in FIG. 1 and serves to illustrate the relationship of the closure feeding apparatus and the closure severing mechanism at rest;

FIG. 11 is an enlarged sectional view taken along line 11—11 of FIG. 9 and illustrates the structure of a closure advancing mechanism;

FIG. 12 is an enlarged sectional view taken along line 12—12 of FIG. 10 showing the structure of a mechanism for causing the closure to be applied about the neck of the bag in accordance with the present invention;

FIG. 13 is an exploded view in perspective of a closure severing mechanism as employed in the present invention;

FIGS. 14 and 15 are fragmentary diagrammatic views of a closure severing mechanism as embodied in the present invention which serves to illustrate partial severing of a closure from a next adjacent closure;

FIGS. 16 and 17 are perspective views of a printing mechanism in accordance with the present invention showing the relationship of the printing mechanism to the closure feed and the mode of operation; and FIG. 18 is a schematic diagram of an electrical circuit for operating and controlling the operation of the embodiment illustrated in FIG. 1.

DESCRIPTION OF THE PREFERRED EMBODIMENT

Figure 3:
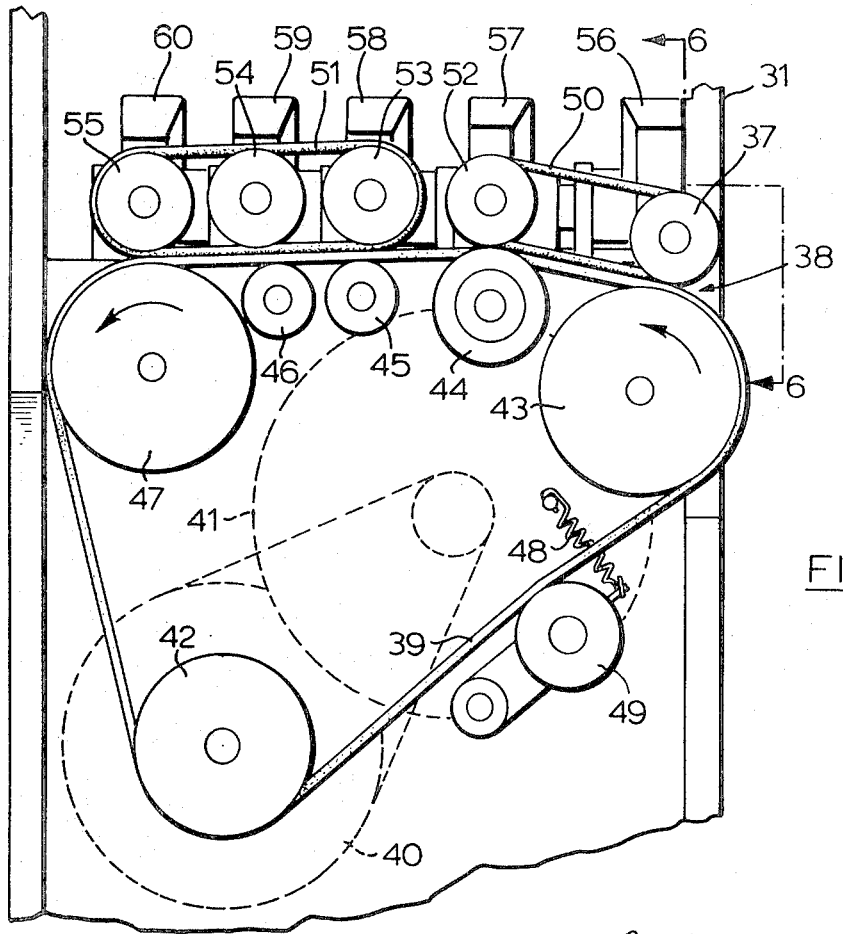
FIG. 3 is a schematic fragmentary view taken from the front of a lower part of a machine embodying the present invention and serves to illustrate a bag conveying mechanism in accordance with the present invention.
Figure 4:
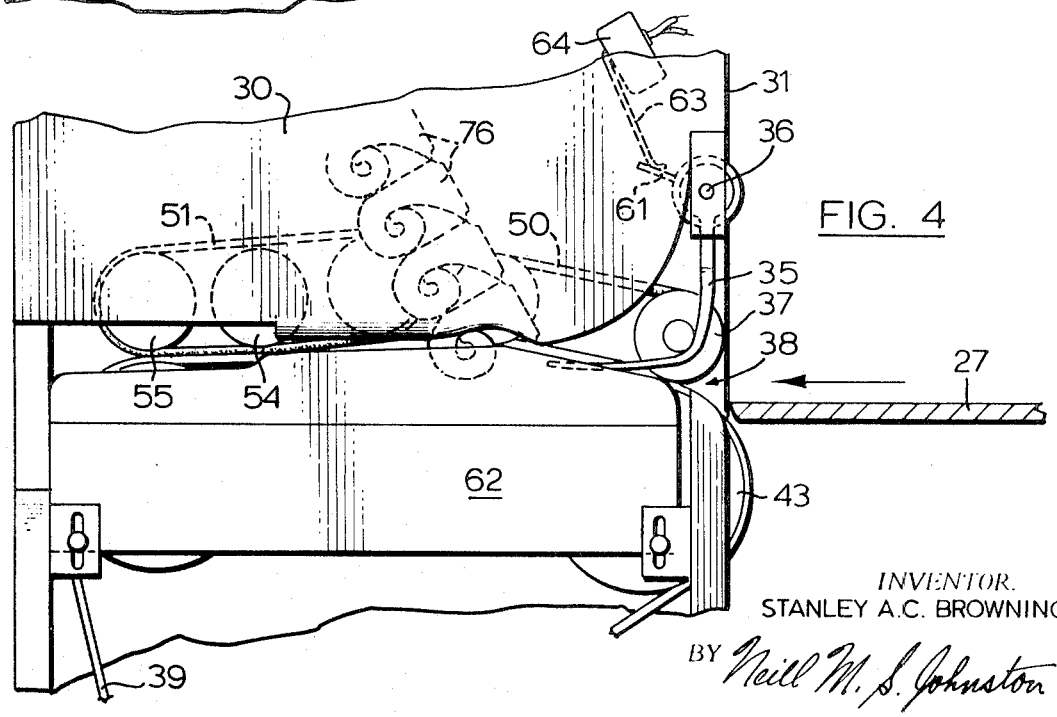
FIG. 4 is a schematic fragmentary view taken along line 4—4 of FIG. 1 and serves to illustrate the relationship from a front view of a mechanism for advancing a bag to which a closure is to be applied to a closure applying station.

Referring now to the drawings and in particular to FIG. 1, a closure applying machine 20 is disposed on one side of a conveyor 21 with spaced slats 22 to maintain bags 23 in a spaced predetermined relationship. In this instance the bags are filled with bread and are shown in dotted outline.

Immediately prior to the closure applying machine and adjacent thereto a flattening station 24 is mounted. Flattening station 24 comprises two pairs of rotary brushes 25 and 26, mounted on a platform 27 in the manner shown. These brushes are rotatable as shown in FIGS. 1 and 2 in the direction of the arrows to draw and flatten the bag neck. Any suitable power source may be employed to accomplish rotation of the brushes.

On the edge of conveyor 21 a guide wall 28 with a sloping leading edge 29 serves to lift part of an approaching bag neck above the plane of the conveyor and into the plane of the machine feed.

The external view in FIG. 1 shows a side wall 31 and a front wall 30 from the top inner edge of which a closure guide channel 32 extends to lead closures fed or led from a rotatable magazine 33. On the far side wall a printer 34 is mounted adjacent the closure guide channel 32 to print prices or the like on the individual closures as they pass.

Adjacent the bottom junction of walls 30 and 31 a trip lever 35 is rotatably mounted at 36 in the future path of the bag necks coming from the flatening station 24. There is also visible a belt drive wheel 37.

The view in FIG. 3 is a diagrammatic illustration of the bag neck conveying mechanism with the front wall 30 removed. As in FIGS. 1 and 2, 27 indicates the flattening station platform which is disposed slightly below the belt drive feed opening 38. The belt drive comprises a lower belt 39 and a pair of upper belts 50 and 51. Lower belt 39 is positively driven by a motor 40 and suitable gearing 41, shown in dotted outline, and a series of rotatably mounted wheels 42, 43, 44, 45, 46 and 47. The tension of belt 39 may be adjusted by varying the tension on spring 48 which in turn controls a pulley 49. Belts 50 and 51 are parasitically driven by engagement with belt 39. Belt 50 is supported by spaced apart pulleys or wheels 37 and 52, and belt 51 by pulleys or wheels 53, 54 and 55. Each of these pulleys is rotatably mounted on the ends of arms such as 56, 57, 58, 59 and 60.

Immediately adjacent the above described bag neck conveyor, again in the bag neck travel path, the substantially J-shaped trip lever 35 mentioned previously extends. And immediately adjacent lever 35 in the path of the bag neck travel below front wall 30, a plate 62 is secured. This plate has an upper edge which follows substantially the same path as the bag neck conveyor shown in FIG. 3 to define the lower side of a bag neck guide. The upper side of the guide is defined by the shape of the lower edge of front wall 30.

At the upper end of lever 35 and rotatable therewith an arm 61 extends inwardly and upwardly to contact a depressible switch arm 63 on a switch 64.

Figure 5:
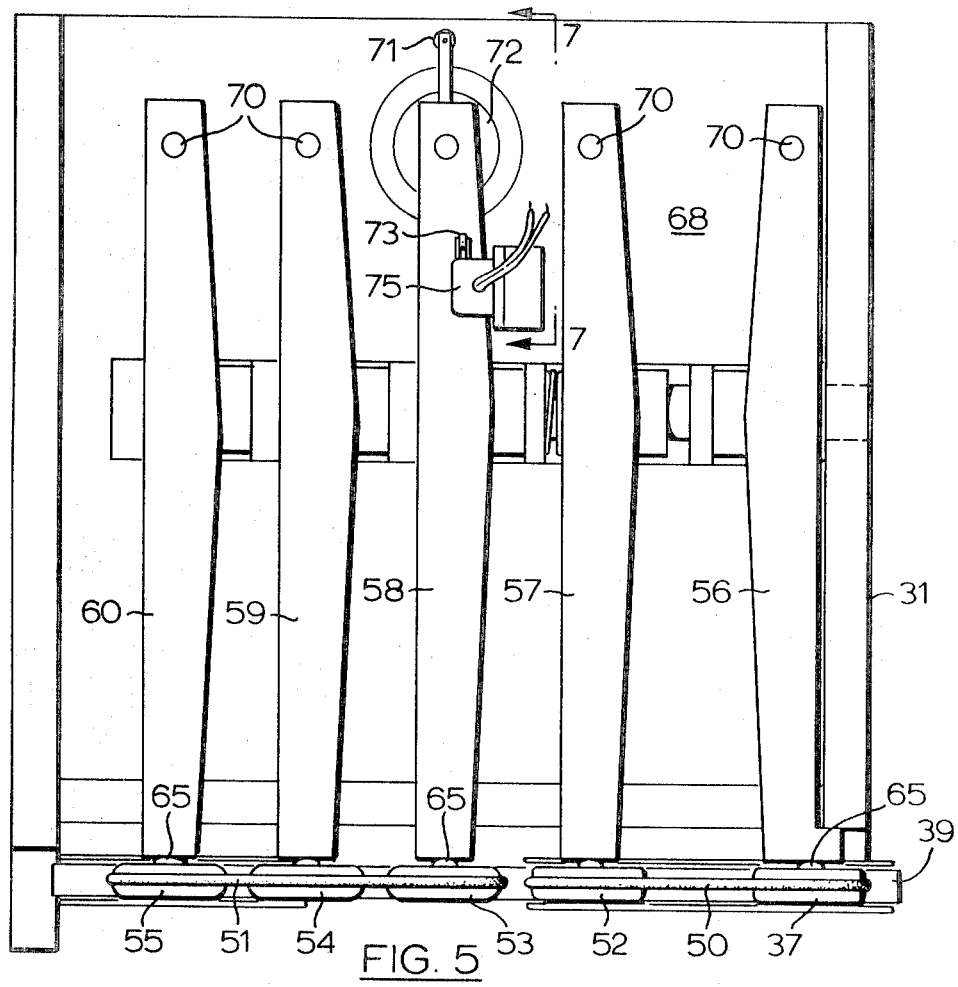
FIG. 5 is a schematic plan view with the top removed of apparatus embodying the invention and serves to illustrate the belt wheel mounting assembly.
Figure 6:
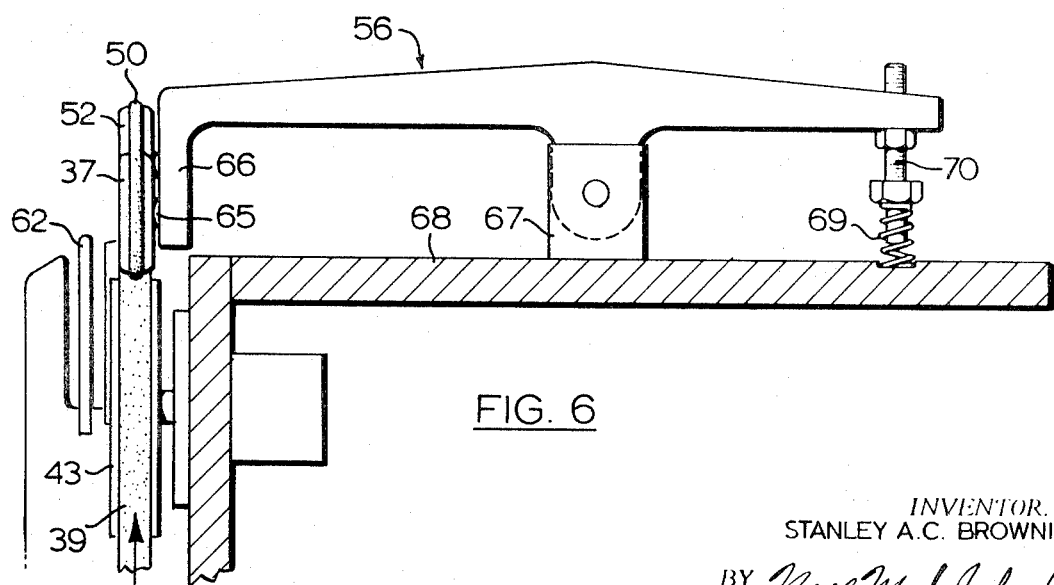
FIG. 6 is a view taken along line 6—6 of FIG. 3.

Pulleys 37 and 52 of belt 40, and 54 and 55 of belt 51 are similarly mounted. All are freely rotatable on shafts such as 65 as seen in FIGS. 5 and 6. These shafts are in turn supported on depending portions 66 of their respective arms. Each of arms 56, 57, 59 and 60 are also similarly mounted on fulcrums 67 to permit individual vertical movement of each wheel. A plate 68 which divides the apparatus into upper and lower chambers provides support for these fulcrums. Arm 56, is typically adjustably biased upward by a spring 69 mounted on a threaded shaft 70 extending between the remote end of arm 56 and plate 68.

Pulley wheel 53 is mounted on arm 58 in a similar manner to the remaining pulley wheels, and arm 58 is also mounted on a fulcrum 67, but the remote end thereof, is, as shown in FIG. 7, normally biased downward by a spring 71, adjustably secured to plate 68. Between fulcrum 67 and the end of arm 58 a pneumatically operated piston 72 engages the underside of arm 58. On the upper side of arm 58 a wheel 73 rests. Wheel 73 is in turn mounted on switch arm 74 of swtich 75 so that on any upward movement of the remote end of arm 58 will be transmitted through wheel 53 and will activate switch 75.

Referring now to FIG. 8, a view from the rear of the interior of front wall 30, closure guide channel 32 is mounted so that the closures indicated as 76 are led down at an angle as shown. These closures as mentioned previously are of the form of those disclosed in Canadian Pat. 738,149. For facility of handling the closures are provided in the form of a strip with adjacent closures being secured to each other by two narrow connections shown at 77 and 78. Connection 77 has an outer concave edge.

Closure guide 32 is rigidly fixed in position and its lower end is open at a point just in advance of a point of contact of belts 51 and 39. With pulley 53 normally biased up, belt 51 does not contact belt 39 at least at the front end. This feature will be more fully described later. The angle of inclination of closure guide 32 is such, as shown in FIGS. 8 and 9, that when the closure is in position the bag neck is adjacent the opening, 80, of the closure.

The structure of the closure guide 32 is a channel with inwardly extending flanges 81 and 82. The various dimensions, the width and depth, of the defined channel are such as to permit the sliding of a strip of the closures 76.

Adjacent the bottom end of channel 32 an opening is provided in the upper wall and flange 81 to permit the entry of a knife 83. A further opening 84 is also provided on the upper side wall of channel 32. Through this latter opening an arm 85 extends. One end of arm 85 is secured to a movable piston rod 86, and to the other end, the end within channel 32, a closure indexing pawl 87 is secured by a shoulder screw 88, to permit movement of the pawl about the axis of arm 85. Pawl 87 has a claw 89 which in the position shown extends through an opening in the closures 76 to engage an edge thereof.

Figure 9:
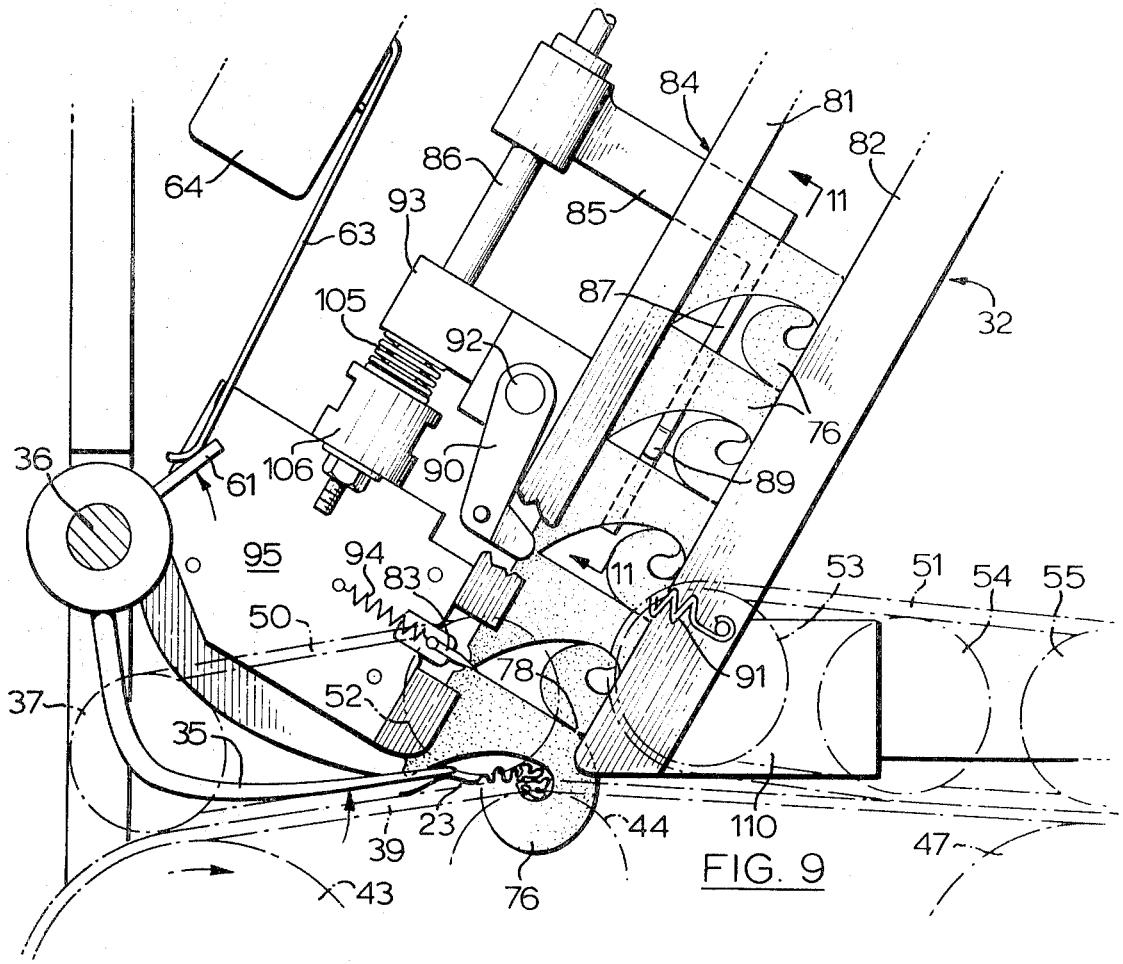
FIGS. 9 and 10 are enlarged fragmentary views of the lower part of FIG. 8 and serve to show the relationship between the various parts during the application of the closure to a bag neck.
Figure 10:
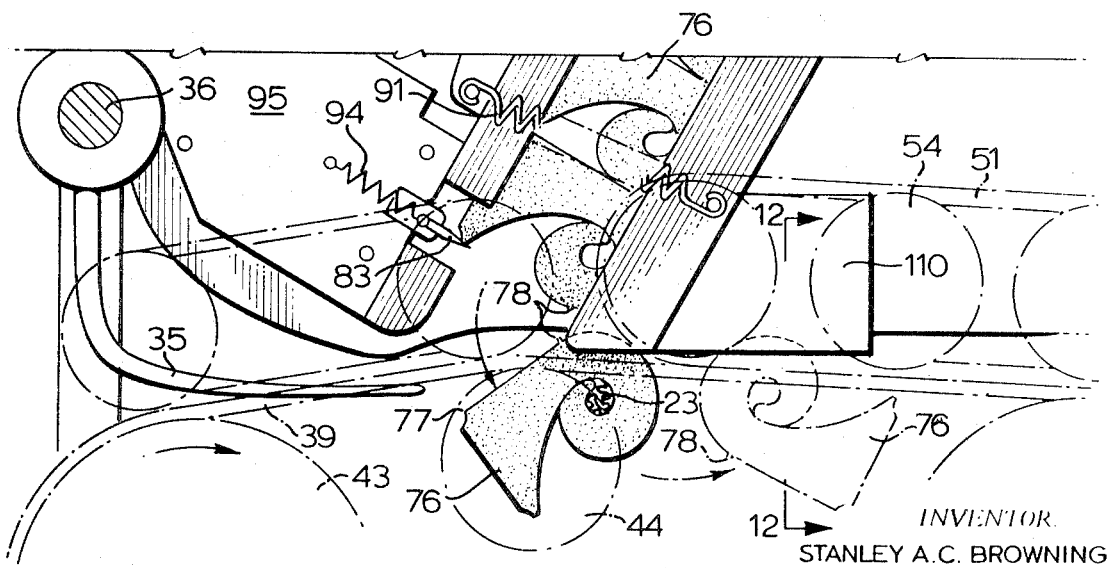

A second pawl 90 is also mounted adjacent the lower end of closure guide 32 to extend through the adjacent side wall in the manner shown in FIGS. 8 and 9. Pawl 90 is shaped to engage the concave edge of the closure junctions and serves to locate the closures in position by engagement therewith. Pawl 90 is swivelably mounted by a shoulder screw 92 on a piston guide 93 and is normally biased to engage the closures by a spring 91.

Knife 83, as mentioned previously, is biased into a normally retracted position by a spring 94 secured to knife 83 and knife housing 95.

The structure of the knife housing 95 and the mechanism for operating the knife is more clearly shown in FIG. 13. A block 96 is provided with a pair of channels 97 and 98 normal to each other. Within channel 98 an L-shaped bar 99 slidably sits. Bar 99 has a channel 100 which receives the knife 83 and which has a corresponding co-operating channel 101. Bar 99 has an upstanding peg with a hole through which it is engaged and secured to piston 86. Channel 101 has an inclined side wall 102 and channel 100 has a tooth 103 which has a corresponding inclined edge. The junction of the channels 97 and 98 are cut to provide a further similarly inclined face 104.

The co-operation between these various surfaces and the tooth enables these parts to slide relative to one another under the action of the piston 86. When the piston is pulled upward tooth 103 urges knife 83 outward to cut. This mode of operation is shown diagrammatically in FIGS. 14 and 15.

Bar 99 is secured to the lower end of piston 86 whose travel is guided by guide block 93 and whose action is limited by a spring 105 and an absorbent pad 106.

Piston 86 is operated by a double-acting air cylinder 107 mounted as shown in FIG. 8. The air is supplied to cylinder 107 through hoses 108 and 109. Although the air source is not shown, any suitable air source may be employed.

To the rear of closure guide 32, in this sense rear is used with respect to the bag neck travel path, a closure revolving block 110 is provided. As shown in FIG. 12 this is a block which is aligned with the path of travel of the closure 76 and which has a channel 111 of upwardly decreasing width so that at its upper limit it is narrower than the width of the closure. The forward movement of the bag neck, the limit of upward travel and the form of the closure cause the closure to rotate as it passes through block 110.

The printing unit 34 illustrated in FIGS. 17 and 18 comprises a housing within which a rotary solenoid is mounted. Solenoid shaft 113 extends through the housing and an arm 114 is mounted thereon to rotate as the shaft 113 is turned. Arm 114 is in turn secured to a printing block mounting 115 which has an open guide channel 116 engageable with a guide pin 117 on its upper surface, and a channelled block 118 mounting a printing block 120 on its lower surface.

The ink supply, an absorbent pad 121 mounted immediately below the printing block 120, supported by a tray 122, also serves to support and communicate with an ink source 123.

The operation of the solenoid causes rotation of arm 114 in a counterclockwise direction with a consequent counter-revolution of printing block 115 into the printing attitude of FIG. 17. Release of the solenoid reverses the process and the printing block 120 is inked by contact with the absorbent pad 121. The operation of the solenoid is synchronised electrically with the completion of the travel of downward travel of the piston 86 so that the motion of the printing block is accomplished when the closures are at rest.

FIG. 18 shows a schematic electric circuit for operating and controlling an apparatus embodying the present invention.

To input terminals 130, a motor 41 is connected through switch 131. The rotary solenoid 132 is connected across rectifier 133 and one side of the rectifier is connected through switches 134, 135 and 136 to a power source. The other side of the rectifier is connected to the input terminal.

An air valve solenoid 141 is connected across relay 140, and switches 75 and 35 are connected in series with the coil of relay 140.

When switches 136 and 135 are made the passage of a bag neck operates switch 35 so that contacts 143 and 142 of relay 140 are closed and air valve 141 is actuated to operate piston 86. When switch 75 is operated by the movement of arm 58 the relay 140 is de-actuated and the air valve operation is reversed.

THE OPERATION

As the bags 23 approach the applicator 20 they are so arranged that the neck overlies platform 27 and the brushes 25 and 26 draw the neck flat towards them in a preliminary flattening operation. The conveyor 21 is in the meantime continuing its travel in the direction of the arrow and the flattened bag neck approaches the feed opening 38. The bag neck is nipped between belts 50 and 39 and carried forward by belts 50 and 39. The motion between the two drives is such that the bag neck, formerly flattened, is gathered into a bunch where it is contacted by the belts. During this step the bag neck also causes lever 35 to rise. The form of lever 35 is such that its free end engages the adjacent end of a positioned closure. With the rotation of lever 35 upward arm 61 is caused to rotate and depress switch arm 63 and actuate the switch 64. Operation of switch 64 causes relay 140 to lock up and actuate a pneumatic reservoir pump or air valve, not shown, which in turn causes piston 86 to be drawn upward.

The knife operating mechanism with the upward motion responds as previously described and the knife 83 is urged outwardly to sever junction 77.

At this point the gathered bag neck is positioned as shown in FIG. 9 in the opening of the closure 76.

Simultaneously with the actuation of the piston into a withdrawn or upward state air is also supplied through an air lock, not shown, to piston 72. The air lock provides a short delay and after this delay piston 72 moves up and causes the adjacent end of arm 58 to tilt upward about its fulcrum 67. Pulley 53 moves down so that belt 51 engages belt 29. Normally there is no engagement between belt 51 and belt 39 as belt 51 passes round pulley 53. The nip produced by the downward movement of pulley 53 between belts 51 and 39 engages the flared portion of the bag neck and pulls the bag neck through between belts 51 and 39. However, the motion of the gathered portion is resisted by the closure 76 which is in its path and both the closure and the gathered portion are pulled by the belts.

It will be noticed that the rear surface of the closure is curved and bears against the surfaces of channel 111 of block 110 and the bag neck closures are relatively rotated to secure the closure about the bag neck. This rotation of the closure causes the breakage of the second junction 78 between the two adjacent closures.

As arm 58 rose switch lever 74 was operated and this in turn disabled the relay 140 causing piston 86 to return to the position shown in FIG. 8.

When piston 86 moves up arm 85 moves with it and pawl 88 swivels about screw 87 so that the claw 89 is drawn back under the next succeeding closure to engage a corresponding closure in a similar manner. With the return of the piston to its down position the next succeeding closure is urged down into the applying position. The final position is determined by pawl 90. This pawl by virtue of its shape and the concave outer edge shape of junction 77 moves out of engagement with the adjacent junction as the closure is urged down by the action of pawl 88 and at the end of the downward travel of piston 86 pawl 90 reseats itself in the aligned closure junction and is positioned for the next cycle.

The action of the conveyor and the trip lever 35 ensure that each time a bag passes through, a closure will be applied.

It will be observed that the apparatus and method of applying the closure to the bag neck is substantially continuous with only a slight pause to synchronize the various movements.

The printing operation also requires a momentary stationary position.

Throughout the description reference has been made to the use of pneumatic cylinders and the cutting operation has been confined to the severence of only one junction. It is feasible to use other mechanisms for actuating the various parts other than air pressure and it will be understood that such power sources are within the contemplation of the present invention. It will also be unnderstood that the separation of one closure from another may also be accomplished wholly by rotation or wholly by cutting.

What I claim as my invention is:

1. Apparatus for applying closures to bag necks which comprises: closure feed means for moving a closure into a bag applying position; conveying means for transporting a bag neck along a predetermined path; said conveying means including a gathering station for collecting a part of said bag neck into a bunch and into a bag applying position; and a closure applying station, said closure applying station including means for moving said bag neck through said closure applying position along said predetermined path (whereby said closure is applied by relative rotation of said bag neck and said closure.) and means for relatively rotating said closure and said bag neck whereby said closure is applied to said bag neck.

2. An apparatus as claimed in claim 1 wherein said closures are fed to said applying position in a strip with each closure being connected to a succeeding closure and further including severing means for separating a closure in said applying position from a succeeding closure in response to movement of said bag neck along said path.

3. An apparatus as claimed in claim 2 wherein said severing means includes knife means for at least partially severing a closure in said applying position from a succeeding closure.

4. An apparatus as claimed in claim 2 wherein said severing means includes means for rotating said closure relative to said bag neck to affect separation of said closure.

5. Apparatus as claimed in claim 3 wherein said knife means is actuated in response to movement of a bag neck through said gathering station.

6. Apparatus as claimed in claim 1 including switch means in said bag neck travel path anterior to said closure applying station, said switch means being actuated by movement of a bag neck in said path, and said closure applying means including movable means for gripping a bag neck along said path after a predetermined interval in response to actuation of said switch means.

7. Apparatus as claimed in claim 1 wherein said conveying means comprises a first endless driven belt, a second endless belt and a third endless belt, said second and third belts being driven by engagement with said first belt; said first and second belts comprising a gathering station and said first and third belts comprising a closure applying station; a first part of said third belt being normally biased out of engagement with said first belt and moveable into engagement therewith in response to a predetermined interval after movement of a bag neck into said gathering station.

8. Apparatus as claimed in claim 1 wherein said closures are fed to said applying position in a strip with each closure being connected to a succeeding closure and wherein said closure feed means comprises a channel having a lower open end adapted to slidably receive said strip of closures and first pawl means moveably engageable with a connection between adjacent closures to temporarily secure said closure in said bag applying position, and second pawl means moveably engageable with said succeeding closure to urge said succeeding closure into a bag applying position upon removal of said first mentioned closure from said bag applying position.

9. Apparatus for applying closures to bag necks which comprises: conveying means for transporting said bags through a closure applying station in a predetermined path; means for guiding said bag neck through said closure applying station; means for responsive to a first movement of said bag neck in said path for locating said gathered bag neck in a predetermined position with respect to a first closure in a closure applying position; feed means for advancing a second closure into a closure applying position in response to removal of a first closure from said closure applying position; and means for rotating said closure about said bag neck in response to further movement of said bag neck, said rotating means including means for parting a first closure from a second succeeding closure.

10. Apparatus as claimed in claim 9 wherein said means for guiding said bag neck through said closure applying station includes a movable arm anterior to said closure applying station, said arm having a free end engageable with a closure in a closure applying position.

11. Apparatus as claimed in claim 10 wherein said means for guiding said bag neck includes a guide channel rearward of the closure applying station, said guide channel having an upwardly decreasing width to engage with an adjacent surface of a closure.

12. Apparatus as claimed in claim 9 including printing means responsive to movement of said bag neck through a first part of said predetermined path to impress indicia on an aligned closure.

References Cited

UNITED STATES PATENTS

| | | | |
|---|---|---|---|
| 3,163,969 | 1/1965 | Irwin et al. | 53—138 A X |
| 3,163,972 | 1/1965 | Irwin | 53—138 A |
| 3,370,396 | 2/1968 | Paxton et al. | 53—138 A |

TRAVIS S. McGEHEE, Primary Examiner